Figure 1:
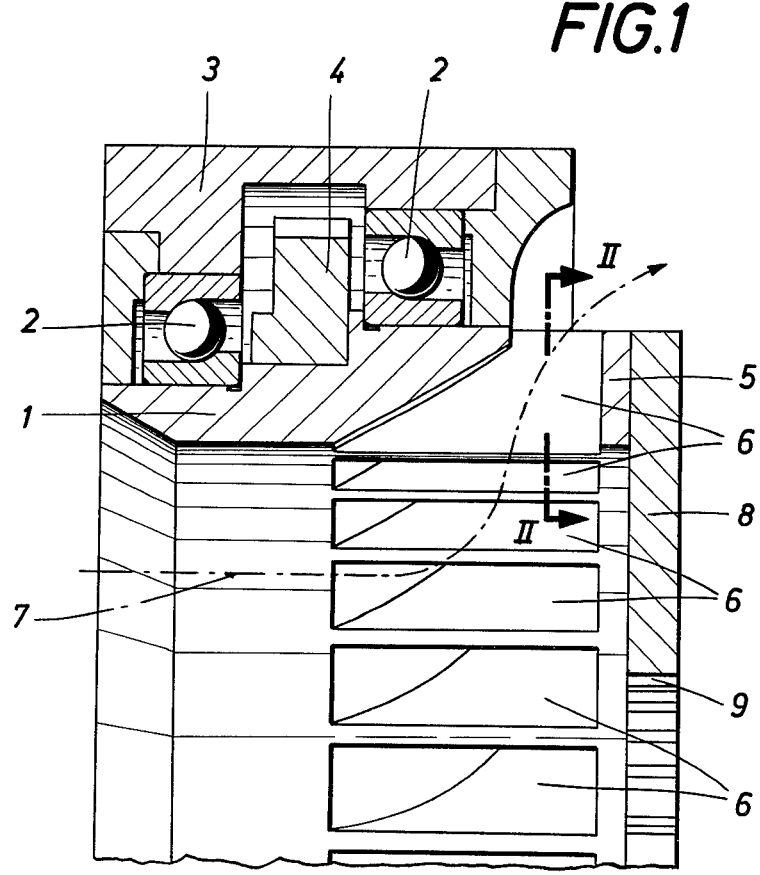

United States Patent
Kralowetz

[11] 3,899,814
[45] Aug. 19, 1975

[54] TOOL FOR MACHINING ROUND SECTIONS

[76] Inventor: Bruno Kralowetz, St. Ulrich 142, Steyr, Austria

[22] Filed: May 22, 1974

[21] Appl. No.: 472,493

[30] Foreign Application Priority Data
June 25, 1973 Austria .............................. 5571/73

[52] U.S. Cl............. 29/105 R; 90/11 A; 144/252 R
[51] Int. Cl.².......................................... B26D 1/12
[58] Field of Search ... 29/105 R; 144/208 E, 252 R; 90/11 A

[56] References Cited
UNITED STATES PATENTS

| | | | |
|---|---|---|---|
| 569,488 | 10/1896 | Elder et al. | 144/252 R |
| 1,153,682 | 9/1915 | Gorton | 29/105 |
| 1,586,186 | 5/1926 | Erdman | 29/105 |
| 2,787,304 | 4/1957 | Brundell et al. | 144/208 E |
| 2,944,465 | 7/1960 | Jones | 144/252 R |

*Primary Examiner*—Leonidas Vlachos
*Attorney, Agent, or Firm*—Kurt Kelman

[57] ABSTRACT

A drum is provided with bearing means for rotatably mounting the drum and has an edge portion which protrudes axially beyond said bearing means and has a free end formed with blades, which constitute a fan adapted to exhaust air from said drum. An annular inserted-tooth cutter having inwardly facing cutting edges and adapted to surround a workpiece to be machined is secured to said free end of said drum and disposed axially outwardly of said fan.

3 Claims, 2 Drawing Figures

TOOL FOR MACHINING ROUND SECTIONS

This invention relates to a tool for machining round sections, comprising a tool drum, which is rotatably mounted in a tool slide or the like and adapted to be driven and which carries an annular inserted-tooth cutter, which surrounds the workpiece and has inwardly facing cutting edges.

Such tools are used, e.g., for an internal milling of screw threads or crankshafts and have proved quite satisfactory. A difficulty resides in that the heat generated in the tool as a result of the machining work leads to expansion and stresses. If the heat generated by machining is conducted from the inserted-tooth cutter into the rotating drum, which is relatively large in diameter, the thermal expansion of the drum gives rise to difficulty at the bearings. The tool must be installed with a considerable radial play so that this thermal expansion can be taken up and the bearings are not destroyed when the tool is working and necessarily subjected to a temperature rise. On the other hand, such bearing play involves an inaccurate and unsteady motion of the inserted-tooth cutter.

In the previously known tools of that kind, the inserted-tooth cutter is disposed approximately at the center of the tool drum so that the heat generated by machining results in a substantial temperature rise not only of the inserted-tooth cutter but also of the entire tool drum. Besides, the hot chips which are formed must be discharged outwardly through one-half of the drum and under centrifugal force are urged relatively strongly against the entire inside surface of the drum, which thus receives heat from the chips so that the temperature of the drum is raised further.

It is an object of the invention to eliminate these disadvantages and to provide a tool which is of the kind described first hereinbefore and can be used without a substantial temperature rise of the tool drum.

This object is essentially accomplished according to the invention in that the tool drum has an edge portion which protrudes beyond the bearing means and which forms blades of a fan which exhausts air out of the drum and the inserted-tooth cutter is secured to the free end of the drum outside of said fan. A fan is thus provided between the inserted-tooth cutter and the tool drum proper and sucks cooling air through the drum and permits only of a small heat transfer from the inserted-tooth cutter to the tool drum. Besides, only part of the chips formed fall into the drum because the other part falls directly on the outside. The chips which enter the drum are thrown outwardly by the fan immediately and cannot deliver heat to the drum. The provision of the inserted-tooth cutter at the free end of the drum in accordance with the invention affords the additional advantage that the cutting edges are well accessible so that adjusting work at the inserted-tooth cutter is greatly facilitated.

Figure 2:
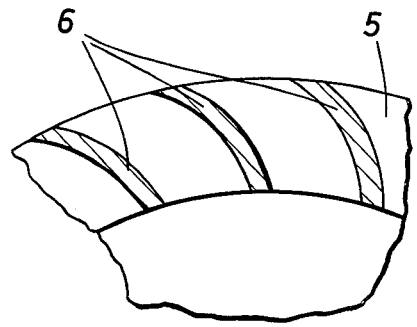

An embodiment of the invention is shown by way of example in the accompanying drawing, in which FIG. 1 is an axial sectional view showing a tool according to the invention and FIG. 2 is a sectional view taken on line II—II in FIG. 1.

A tubular tool drum 1 is rotatably mounted by means of external ball bearings 2 in a tool slide 3 and adapted to be driven by a gear 4. One axial end 5 of the tool drum 1 protrudes beyond the bearing 2 and the projecting drum portion is formed with radial slots in such a manner that the parts of the drum between the slots constitute blades 6 of a fan, which sucks fresh air through the drum cavity and blows out the air through the radial slots, as indicated in FIG. 1 by the arrow 7. An annular inserted-tooth cutter 8 is secured to the axially terminal portion of the tool drum 1 and comprises inwardly facing cutting edges 9.

During the use of the tool, the drum 1 rotates so that the blades 6 produce in the drum 1 a uniform current of air toward the inserted-tooth cutter so that the drum is cooled and an effective heat barrier is formed between the inserted-tooth carrier 8 and the shell of the drum 1. As a result, a transfer of the heat generated by machining from the inserted-tooth cutter 8 to the drum 1 is prevented or greatly restricted so that said heat cannot result in an undesired expansion and stresses.

What is claimed is:

1. A tool arrangement comprising:
   a. a drum member having an axis and formed with an axially open cavity, said drum member having an axially terminal portion;
   b. a bearing engaging an axial portion of said drum member spaced from said terminal portion for rotation of said drum member about said axis,
      1. the portion of said drum member axially intermediate said engaged portion and said terminal portion being formed with a plurality of openings extending radially therethrough;
   c. an annular cutter mounted on said terminal portion and including a plurality of cutting edges directed in a radially inward direction; and
   d. fan means on said drum member for drawing a stream of air from said cavity radially outward through said openings when said drum member rotates about said axis.

2. A tool arrangement as set forth in claim 1, said fan means including a plurality of blade members distributed about said axis and constituted by respective parts of said drum member separated by said openings.

3. A tool arrangement as set forth in claim 1, further comprising a support, said bearing being interposed between said support and drum member.

* * * * *